June 4, 1968 B. R. BUDNY 3,387,264

TIME DIVISION MULTIPLEXER HAVING SYNCHRONIZED MAGNETIC CORE TRANSMITTER AND RECEIVER

Filed July 29, 1964

7 Sheets-Sheet 1

INVENTOR
BERNARD R. BUDNY

BY
Arnold J. Ericsen

ATTORNEY

INVENTOR
BERNARD R. BUDNY
BY
ATTORNEY

INVENTOR
BERNARD R. BUDNY

BY Arnold J. Ericsen

ATTORNEY

INVENTOR
BERNARD R. BUDNY
BY [signature]
ATTORNEY

INVENTOR
BERNARD R. BUDNY

BY [signature]

ATTORNEY

INVENTOR
BERNARD R. BUDNY

BY Arnold J. Ericsen

ATTORNEY

INVENTOR
BERNARD R. BUDNY

BY Arnold J. Ericsen

ATTORNEY

United States Patent Office 3,387,264
Patented June 4, 1968

3,387,264

TIME DIVISION MULTIPLEXER HAVING SYNCHRONIZED MAGNETIC CORE TRANSMITTER AND RECEIVER

Bernard R. Budny, Milwaukee, Wis., assignor to Allen-Bradley Company, Milwaukee, Wis., a corporation of Wisconsin Filed July 29, 1964, Ser. No. 385,903
7 Claims. (Cl. 340—147)

ABSTRACT OF THE DISCLOSURE

A time division multiplexer comprising a sending pulse generator including a plurality of independently saturable inductors arranged to be driven to a periodic unsaturated state responsive to a source generating a plurality of phase discrete electrical signals, a coder for the generated signals, a single electrical conductor for transmitting the coded signals to a receiving station, the receiving station including a decoder and a plurality of independently saturable inductors also arranged to be periodically driven to an unsaturated state by a source generating electrical signals in a definite phase relationship with the signals driving the inductors of the sending station. There are preferably provided unidirectional current control elements, such as diodes to prevent the signals from passing through from one inductor to a neighboring inductor at the sending station or from one inductor to a neighboring inductor at the receiving station, and thereby facilitate transmission of the signal between stations.

The present invention relates generally to a time division multiplexer and more specifically, to a novel multiplexer including a static magnetic pulse generator which converts standard line voltage and frequency to a plurality of discrete phase related electrical pulse signals, a coder for coding or selecting the signals according to the information to be relayed, and a single electrical path over which the coded signals are transmitted to a receiving station where the information is decoded.

As means of illustration, the principles of the present invention are herein described as incorporated in a system for successively and simultaneously controlling a plurality of remotely located machines or other electrically activated devices from a single pilot position. The system includes a magnetic pulse generator and a coder located at the pilot, or sending station. The pulse generator includes a plurality of non-linear inductors each of which carry input and output windings. The input windings of the inductors are connected across an alternating voltage source, and the output windings are connected to the coder. Each inductor has a magnetic frame, or core, which is saturated during a portion of the cycle of the source voltage and unsaturated during the remainder of the cycle. The inductors are arranged and designed so that they are individually unsaturated successively; and during the period of unsaturation, each produces a phase discrete signal across its corresponding output winding. The signals are coded, or selected, by an operator according to the devices to be controlled and transmitted over a single electrical path to a decoder located at a receiving station.

The receiving station may comprise any one of various means for decoding the transmitted information. For example, as illustrated herein, it may take the form of a coincidence detector in which case the receiving station includes a second pulse generator analogous to the pulse generator at the sending station. The second pulse generator is connected to the coincidence detector and generates a phase discrete pulse signal for each of the devices to be controlled such that when there is coincidence between a signal at the receiving station and a signal transmitted from the pilot position, a specific load device receives control information. The pulse generator includes a plurality of non-linear inductors arranged and designed to coincide with the non-linear inductors of the pulse generator at the sending station and are excited by an alternating voltage source synchronized with the first source.

In present day usage there are numerous applications requiring remote control nad in which a plurality of interconnecting lines between the control devices and pilot position are cumbersome and expensive. For example: control and supervisory circuits in mines, buildings, ships and aircraft; along oil and gas pipelines; and traffic systems are illustrations at which remote control over a single electrical path is desirable.

Remote control multiplex systems are presently available. They are primarily divided into two main classes: time division multiplex systems and frequency division multiplex systems. Multiplex systems of the former class transmit a plurality of signals each of which are distinguishable from one another by their relative phase or time. Frequency division multiplex systems, however, transmit signals which are distinguishable from one another by their relative frequencies.

The present invention is concerned primarily with a time division system. Time division multiplex systems have certain advantages over frequency division systems, two key advantages of which are (1) for a comparable circuit complexity and given information capacity the signal to noise ratio is better; and (2) the decoding means are simpler and less expensive than for frequency division multiplex systems which generally require a number of tuned circuits. Furthermore, in both the frequency division and time division systems heretofore available the electrical characteristics need be more carefully defined to insure satisfactory operation than the present invention which is merely concerned with whether the magnetic cores are in a saturated or unsaturated state. Incorporation of the principles of this invention provides an improved static time division multiplex system that is rugged, reliable and stable; and which by utilization of small cores and proper design can be arranged in compact and lightweight structure. Also, long life, high reliability and temperature stability are retained where the sending station or receiving station or both are subjected to adverse environmental and electrical conditions.

Accordingly, it is an object of the present invention to provide a time division multiplex system that is essentially magnetic and highly reliable.

Another object of the invention is to provide a rugged multiplexer capable of absorbing vibrations and shocks to which it is subjected at both or either the sending or receiving stations.

Another object is to provide a multiplexer that is capable of reliable operation in environments exposing the sending station or receiving station or both to adverse atmospheric conditions.

Another object is to provide a multiplexer without any moving parts.

Another object is to provide a multiplexer which will efficiently operate from a single or multiple phase source.

A further object is to provide a multiplexer that is capable of two-way transmission over a single electrical path.

The foregoing and other objects will appear in the description to follow. In the description, reference is made to the accompanying drawings which form a part hereof in which there are shown by way of illustration specific embodiments in which this invention may be practiced. These embodiments will be described in sufficient detail to enable those skilled in the art to practice this invention, but it is to be understood that other embodiments of the invention may be used and that changes may be made in the embodiments described without deviation from the scope of the invention. Consequently, the following detailed description is not to be taken in a limiting sense; instead, the scope of the present invention is best defined by the appended claims.

Figure 1:
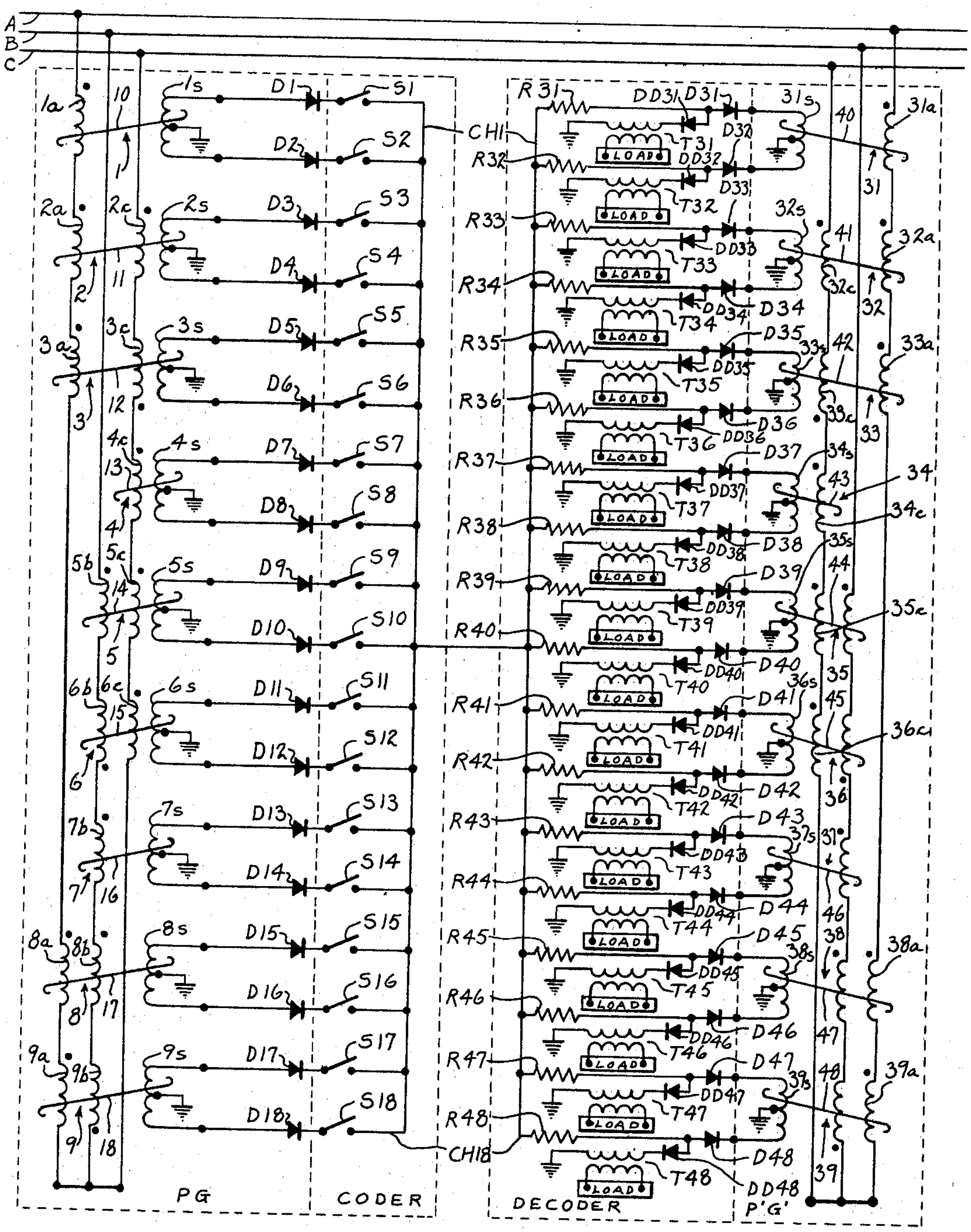
FIG. 1 is a schematic wiring diagram of a time division multiplexer in the form of a remote multiple load control embodying the principles of this invention.

Referring to the drawings, there is shown in FIG. 1 an eighteen channel CH1–CH18 time division multiplexer in the form of a remote multiple load control. (In order to avoid crowding the drawing of FIG. 1, only the channels CH1 and CH18 are so designated.) The sending, or pilot, position includes a pulse generator diagrammatically represented by the broken line diagram PG. The pulse generator PG incorporates a set of nine non-linear inductors respectively represented by the general reference characters 1–9. Each inductor 1–9 has a saturable magnetic core diagrammatically represented by the partially oblique lines 10–18, respectively. The magnetic cores 10–18 will be comprised of magnetic material shaped in suitable geometry, as well known in the reactor and magnetic amplifier art, to support and be linked by input and output windings. The generator PG is supplied by a regulated three phase voltage source, diagrammatically represented by the lines A, B and C. The inductor 1 is connected to the line A through an input winding 1*a*. The inductor 2 is connected to the lines A and C through a pair of input windings 2*a* and 2*c*, and the inductor 3 to the lines A and C through a set of input windings 3*a* and 3*c*. The inductor 4 is connected to the line C through an input winding 4*c*, and the inductors 5 and 6 are each connected to the lines B and C through a pair of input windings 5*b*, 5*c* and 6*b*, 6*c*, respectively. The inductor 7 is connected to the line B through an input winding 7*b*, and the inductors 8 and 9 are each connected to the lines A and B through a pair of input windings 8*a*, 8*b* and 9*a*, 9*b*, respectively.

The input windings 1*a*–9*a*, inclusive, are connected in series as shown, and for the purposes of discussing the operation of the apparatus, polarity marks have been applied to the ends of each winding. The windings 5*b*–9*b* and 2*c*–6*c* are connected in series as shown and possess polarity marks.

The inductors 1–9 each have an ouput winding 1*s*–9*s*, respectively. In FIG. 1, each of the output windings 1*s*–9*s* has a common ground center tap, said ground being common to the system. The non-grounded terminals of each of the output windings 1*s*–9*s* are individually connected to a unidirectional current control element, represented in FIG. 1 by unidirectional diodes D1–D18, with the anodes of the diodes being connected to the output windings.

The coder, which is diagrammatically represented by the broken line block diagram entitled CODER, includes a plurality of switches S1–S18, respectively connected to the cathodes of the diodes D1–D18. The switches S1–S18 are also connected in common with a single interconnecting path L30 which joins the sending and receiving positions.

Figure 2:
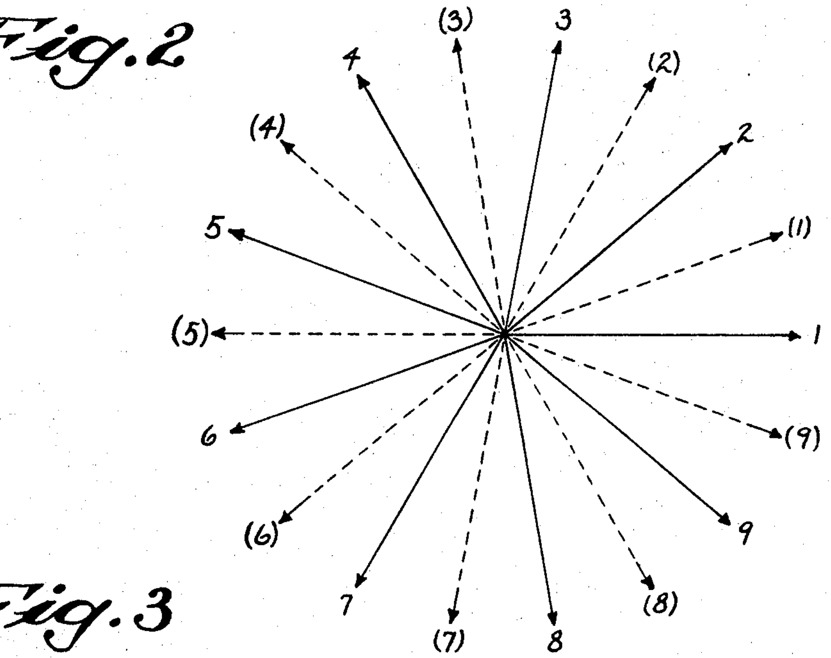
FIG. 2 is a phasor diagram of the total magnetomotive force in each of the cores of the non-linear inductors illustrated in FIG. 1.

The theoretical operation of the sending station is believed to be as herein set forth. The three-phase source, represented by the line A, B and C, provides current to the primary windings of the non-linear inductors 1–9. The total primary current of each inductor 1–9 is equivalent to the phasor sum of the individual current through its respective input windings. The phasor sum of the current is dependent upon the phase relationship between the currents in the lines A, B and C and the polarity of the individual input windings. The primary current of each inductor results in the generation of a magnetomotive force in its respective saturable core 10–18. The magnetomotive force is in phase with the current and just before the time the magnetomotive force phasor passes through zero or 180 degrees, the respective core becomes unsaturated and a voltage is supported across the corresponding output winding 1*s*–9*s*. For example, FIG. 2 represents a phasor diagram for the magnetomotive force of each of the non-linear inductors 1—9 with each phasor 1–9 carrying the numeral designation of its corresponding non-linear inductor. The solid lines represent the phase relationship of the magnetomotive force of the various cores 10–18 at the time the magnetomotive force of the core 10 of the non-linear inductor passes through zero in a positive direction. The broken lines represent the phase relationship at the time the magnetomotive force of the core 14 of the inductor 5 passes through 180°. The cores 10–18 are arranged and the windings wound according to the polarity designations shown in FIG. 1, and those skilled in the art will readily recognize that by proper design the inductors will be arranged such that their respective core are unsaturated successively and individually at a specific time.

As illustrated by FIG. 2, the polarity of the input windings of the inductors 1–9 and the arrangement of the cores 10–18 of FIG. 1 are such that for every 20 degree shift in time relationship, the magnetomotive force of one, and only one, of the cores 10–18 passes through the zero or 180 degree point. For example, at the time the core 10 becomes unsaturated, a signal appears across the output winding 1*s* and the cores 11–18 remain saturated such that their respective output winding 2*s*–9*s* appear as short circuits and support no voltage. The core 10 of the non-linear inductor 1 remains unsaturated for 20 degrees at which time the magnetomotive force vector of the core 14 of the non-linear inductor 5 passes through the 180 degree point such that it becomes unsaturated and produces a negative signal across the output winding 5*s*. At the point the core 14 was driven out of saturation, the core 10 returned to the saturated state. Likewise, as the source voltage represented by the lines A, B and C makes a complete cycle, the cores 10–18 are successively and individually unsaturated twice—once at zero and again at 180 degrees— such that each of the non-linear inductors 1–9 generates two signals, one positive and one negative, across its respective output windings 1s–9s. Accordingly, between the common ground and the opposing terminals of the output windings 1s–9s the pulse generator PG provides eighteen positive phase discrete signals for each cycle of the source current across the lines A, B and C. The various signals and their respective phase relationship are illustrated by a diagram 300 of FIG. 3. In the diagram 200 the signals each carry a numeral 1–18, respectively, illustrative of the channel CH1–CH18 with which each signal coincides. It may be noted that each signal has a duration of twenty degrees and that no two signals exist at the same instant. It should also be noted that the repetition rate of each signal coincides with the frequency of the source voltage, i.e., if the source voltage has a frequency of sixty cycles per second, each of the signals of the diagram 300 repeats itself sixty times each second.

Figure 3:
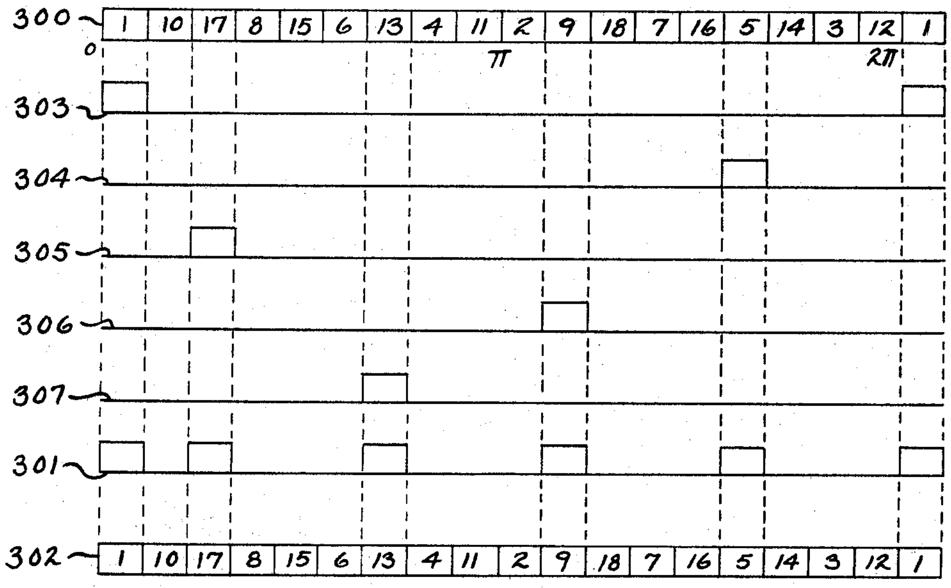
FIG. 3 is a time diagram of the signals generated by the pulse generator at the sending station and the pulse generator at the receiving station, and also illustrates the signals received by the load devices to be controlled according to the embodiment of FIG. 1.

An operator codes, or selects, the individual signals by successively or simultaneously closing any one or all of the switches S1–S18. As means of illustration, assume that an operator desires to transmit the signal of the channel CH1. The operator closes the switch S1 and the signal of the channel CH1 passes through the diode D1 and across the interconnecting path L30. Likewise, if the operator desires to send the signal of the channel CH5, the switch S5 is closed simultaneously or successively with the switch S1, and the signal of the channel CH5 passes across the interconnecting line L30 and lags the signal of the channel CH1 by two hundred and eighty degrees. The diagram 301 of FIG. 3 illustrates the time relationship of the signals passing across the line L30 when the operator selects the channels CH1, CH5, CH9, CH13 and CH17. Obviously, the operator may select any individual or combination of channels at any time. It may be noted that the diodes D1–D18 of the channels CH1–CH18, respectively, each block signals attempting to pass through its corresponding output winding 1s–9s in a reverse direction. Thus, the only complete path of the signals of each channel is across the interconnecting path line L30 to the receiving station.

In the embodiment of FIG. 1, the receiving station includes a pulse generator, diagrammatically represented by the broken line diagram P'G'; a coincidence detector for decoding the transmitted information, diagrammatically represented by the broken line diagram DECODER; and means for conveying the desired information to the load device. The pulse generator P'G' is similar to the pulse generator PG. The pulse generator P'G' includes a set of nine nonlinear inductors 31–39, each having a magnetic core diagrammatically represented by the partially oblique lines 40–48 and similar to the cores 10–18. The inductors 31–39 have a plurality of input windings 31a–33a, 38a, 39a, 32c–36c, and 35b–39b; the polarity of which corresponds to the windings 1a–3a, 8a, 9a, 2c–6c, and 5b–9b, respectively. The input windings of the inductors 31–39 are connected to the lines A, B and C which are also connected to the input windings of the pulse generator PG. The non-linear inductors 31–39 each have an output winding 31s–39s, respectively, similar to the output windings 1s–9s. The output windings 31s–39s each have a center tap connected to the common ground.

The coincidence detector, or decoder, includes a set of unidirectional current blocking elements, represented by the unidirectional diodes D31–D48. The cathodes of each of the diodes D31–D48 are respectively connected to a terminal of the output windings 31s–39s. The anodes of the diodes D31–D48 are each connected to a resistor R31–R48, respectively. Each of the resistors R31–R48 is connected in common with the connecting line L30. The anode of each of the diodes D31–D48 is also respectively connected to the anode of a corresponding unidirectional current control element, represented by the diodes DD31–DD48. The cathode of each of the diodes DD31–DD48 is connected to a grounded output transformer T31–48, respectively. The transformers T31–T48 each have a secondary winding which may be directly or indirectly connected to the load device to be controlled.

The pulse generator P'G' generated eighteen discrete signals each of which has a time relationship corresponding with a signal generated by the pulse generator PG at the sending station. The components and operation of the pulse generator P'G' is similar to that of the pulse generator PG, and since both pulse generators are supplied by the same three phase source represented by the lines A, B and C, precise synchronization between the corresponding signals is assured. It need be appreciated that the present embodiments are illustrative only and in many applications it will not be possible to have the same source supply both the pulse generators PG and P'G'. In such cases, it is only necessary that the sources of the two generators be synchronized and not necessarily common. FIG. 3 illustrates the time relationship between the signals generated by the pulse generators PG and P'G'. The diagram 300, as previously mentioned, illustrates the time relationship between the various signals generated by the pulse generator PG. The time diagram 302 illustrates the time relationship between the various signals generated by the pulse generator P'G'. It may be noted that for each signal generated by the pulse generator PG, the pulse generator P'G' generates a coinciding signal, as indicated by the numerals in each signal of the diagram 302. For example, the signals 1 and 2 of the diagram 302 represents the signals of the inductor 31 which coincide with the signals 1 and 2 generated by the inductor 1 as shown in the diagram 300.

The signals selected by the operator at the sending station and transmitted across the interconnecting path L30 pass through each of the resistors R31–R48 and appear at the anodes at each of the diodes D31–D48 and the diodes DD31–DD48. Thus, each signal has a choice between two paths to ground—through the diodes D31 and D48 and the output windings 31s–39s or through the diodes DD31–DD48 and the transformers T31–T48. Obviously, the signals desire the path of least impedance. In determining which path has the least impedance, it need be realized that during the period of saturation, a non-linear inductor carries no potential across its output windings and thus appears as a near short circuit. However, during the period of unsaturation a potential is carried by the output windings, of the unsaturated transformer. The potential appears between ground and the cathode of the diode connected to the secondary winding of the unsaturated inductor. When there is time coincidence between the transmitted signal and the period of unsaturation, one of the diodes connected to the secondary winding of the unsaturated inductor has two time coincident signals of opposite polarity—one on the cathode and one on the anode. By proper design such that the signal on the cathode is of larger magnitude, the diode is back biased and appears as an open circuit. Since the diode appears open, the signal on the anode of the back biased diode can not pass through said diode and thus takes the path of less resistance which will be through the output transformer to ground. At the same time, if there is not time coincidence between the transmitted signals and the period of unsaturation of the inductors at the receiving station, during the time the pulse is at the anode of the diode D31–D48, there is no potential across the corresponding secondary winding of the saturated transformers, and the path of least impedance is through the output windings to ground rather than through the corresponding diodes DD31–DD48 and the output transformers T31–T48. However, as shown in diagram 302, the pulse generator P'G' always has one inductor in the unsaturated state such that one of the output windings 31s–39s carries a blocking signal. During this period, if the blocking signal coincides with a transmitted signal, the transmitted signal is blocked from passage through the output winding of the unsaturated inductor and passes through the corresponding output transformer and to the load to be controlled. It shall be noted from diagrams 300 and 302 of FIG. 3, that for every transmitted signal there is always one inductor at the receiving station unsaturated. To be more explicit, assume that the switch S1 of the channel CH1 is closed. At the precise time that the non-linear inductor 1 becomes unsaturated, a pulse signal appears across the output winding 1s. The signal, which is illustrated in diagram 300 by the numeral 1, passes across the interconnecting line L30 and through the resistors R31–R48. The resistors R31–R48 change the nature of the signal from a voltage source equivalent at the sending end to a current source at the receiving station. The resistance value of each of the resistors R31–R48 should be of substantial value compared to the impedance value of the saturated cores such that the resistors minimize the loading effect of the saturated cores. After passing through the resistors R31–R48, the signal of the channel CH1 appears at the anodes of each of the diodes D31–D48 and DD31–DD48 and seeks the path of least impedance to ground. Now, referring to FIG. 2 and recalling that the inductors are unsaturated only when the total magnetomotive force passes through zero and one hundred and eighty degrees, the phasor diagram illustrates that during the time the non-linear inductor 1 produces a signal, the remaining inductors 2–9 are saturated such that no other signal is generated during the twenty degree duration of the signal of the channel CH1. Also, since the pulse generator P'G' is designed to coincide with the pulse generator PG, and the sources of the two pulse generators are in precise synchronization, the non-linear inductor 31 is unsaturated and the inductors 32–39 saturated during this time period. Thus, the signal of CH1 appearing at the anodes of the diodes D33–D48 and DD33–DD48 passes through the output windings 32s–39s of the saturated inductors 32–39 to the common ground rather than through the diodes DD33–DD48. However, the non-linear inductor 31 produces a coinciding signal which appears at the cathode of the diode D31 causing the diode D31 to appear as an open circuit. Thus the signal of the channel CH1 is blocked from passage through the diode D31. Accordingly, the signal takes the alternative path through the diode DD31 and the transformer T31, thus providing a control signal to the load across the transformer T31, as illustrated by the diagram 303 of FIG. 3. It shall be further noted that the diode D32 is connected to the secondary winding 31s and that the signal of the channel CH1 appears at the anode of the diode D32 and DD32. Though during the period of unsaturation, the inductor 31 provides a signal across the output winding 31s between ground and the cathode of the diode D32, due to the polarity of the winding 31s it is of opposite polarity to the transmitted signal of the channel CH1. Accordingly, rather than appearing as an open circuit as it does on the opposite side of the winding, the path to ground through the secondary winding 31s and through the diode D32 is of low impedance as compared to the path to ground through the transformer T32.

FIG. 3 further illustrates the output signals of the channels CH5, CH9, CH13 and CH17. These channels were previously selected in the discussion for illustrative purposes and the diagrams 304, 305, 306 and 307 show the output signals as they respectively appear across the output transformers T35, T39, T43 and T47. As previously mentioned the signals may be fed either directly or indirectly into the load device to be controlled. For example, if the signals are not of sufficient power to excite the device to be controlled, the signal may be utilized to energize a small relay which in turn controls power delivered to the load device.

The embodiment of FIG. 1 illustrates only eighteen channels. By proper design, selection of core material and polarity on the input windings, the system may be increased or decreased to any desired number of channels. For example, if thirty channels are desired, fifteen cores with grounded center taps can be used. The cores and polarities of the windings need be selected so that for every twelve degrees a core passes through the unsaturated state at either zero or one hundred and eighty degrees. The signals of the thirty channel system will still have a repetition rate equivalent to the frequency of the source voltage, but the duration of the signal will be decreased to twelve degrees rather than twenty degrees as is the case with eighteen channels.

Figure 4:
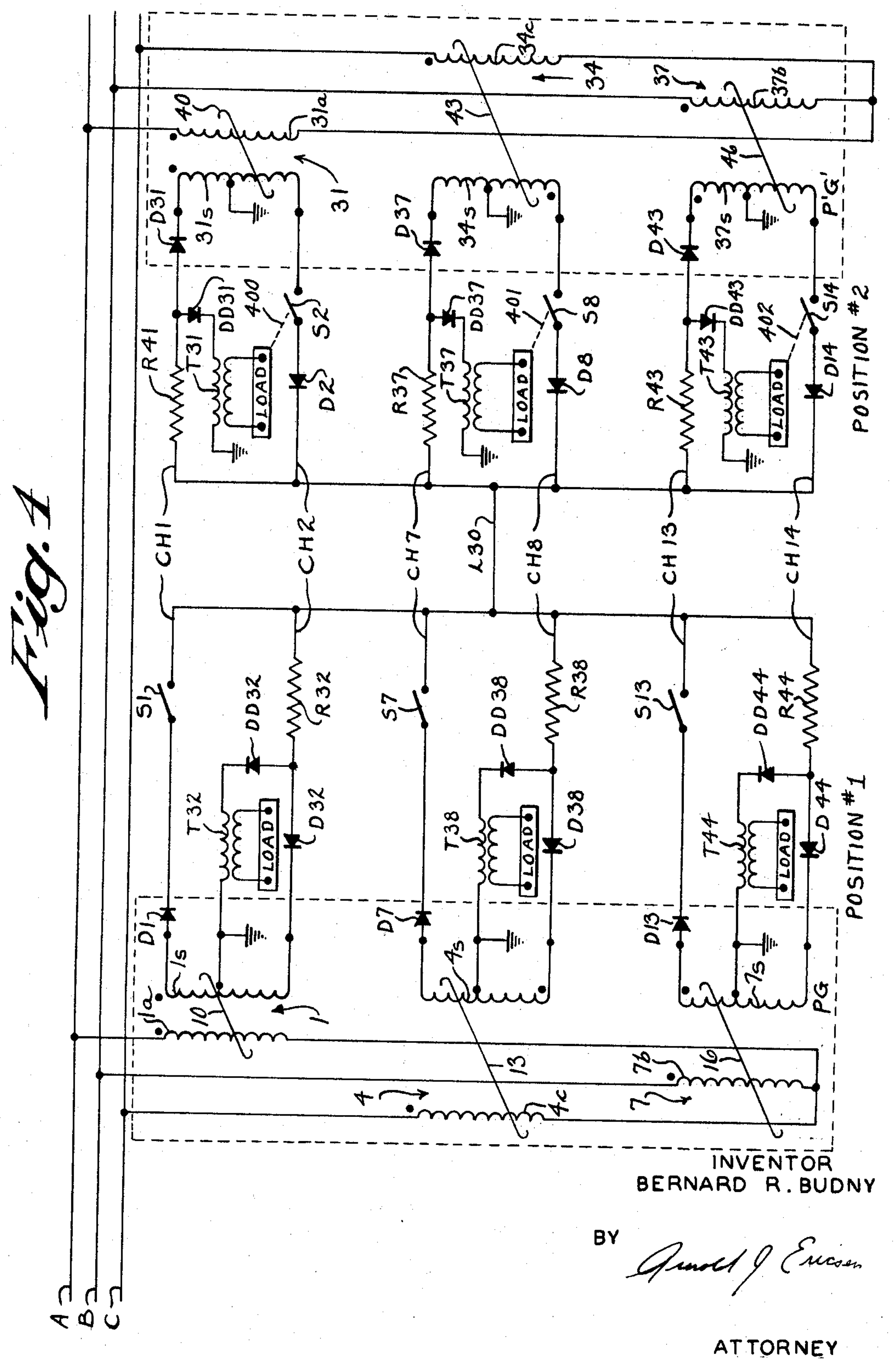
FIG. 4 is a schematic wiring diagram of a bi-directional time division multiplexer in the form of a remote multiple load control embodying the principles of this invention.

There are numerous applications where multi-channel two-way transmission over a single electrical path is desirable. For example, one application may be found in FIG. 1. An operator after sending a signal to actuate a certain machine cannot be assured that the machine is is fact actuated. Thus, it is desirable to have the machine return a signal indicating whether or not it has in fact been actuated. FIG. 4 illustrates an embodiment incorporating the principles of the present invention wherein two-way communication is accomplished over a signal electrical path. As means of simplicity and preciseness of explanation, FIG. 4 is shown as incorporating the components of the channels CH1, CH2, CH7, CH8, CH13 and CH14 of FIG. 1, and each component carries the same designation numerals and letters as in FIG. 1. The channels CH1, CH7, and CH13 of FIG. 4 are arranged in the same manner as in FIG. 1. The components of the channels CH2, CH8 and CH14 are interchanged such that the receiving end of the channels CH2, CH8 and CH14, as shown in FIG. 1, are placed at position 1 in FIG. 4 which corresponds to the sending end of the channels CH1, CH7 and CH13. The sending end of the channels CH2, CH8 and CH14, as shown in FIG. 1, are shown in position 2 of FIG. 4 which corresponds to the receiving position of the channels CH1, CH7 and CH13. Thus, in FIG. 1 the signals generated by the pulse generator PG for the channels CH2, CH8 and CH14 are transmitted across the interconnecting line L30 to the receiving position. However, in FIG. 4, the signals generated by the pulse generator PG for the channels CH2, CH8 and CH14 are used as receiving end signals to coincide with the signals of the non-linear inductors 31, 34 and 37 of the pulse generator P'G' which are utilized as sending signals when the switches S2, S8 and S14 are closed at position 2.

Accordingly, if an operator desires to actuate the load device across the transformer T31, a signal is sent across the channel CH1 through the transformer T31 and to the machine designated as load to be controlled. For illustrative purposes, the embodiment includes a sensing means, diagrammatically represented by the broken line 400, such that upon receiving the signal of the channel CH1 and being controlled, the load device is arranged to close the switch S2. Thus, the channel CH2 returns the signal, shifted one hundred and eighty degrees with respect to the sending signal of the channel CH1. The return signal of the channel CH2 appears at the anodes of the diodes D32 and DD32 of the channel CH2, D38 and DD38 of the channel CH8, and D44 and DD44 of the channel CH14. However, the polarity and timing of the return signal of the channel CH2 coincides with the blocking signal between the common ground and the cathode of the diode D32, while at the same time the non-linear inductors 13 and 16 are saturated such that the windings 4s and 7s appear as near short circuits to ground. Thus, the signal of the channel CH2 appearing at the junction of the anodes of the diodes D32 and DD32, is blocked from passage through the diode D32 and passes through the diode DD32 and the transformer T32. Across the output winding of the transformer T32 may be connected means for utilizing the pulse signal to control steady direct current or alternating current signal sufficient to operate a light or other signaling device. The signaling device indicates that the load across the transformer T31 is operating as desired. Obviously, if the operator receives no signal from the signal device, he is aware that the load across the transformer T31 has not been actuated. The channels CH7, CH8, CH13 and CH14 function in a similar manner whereby the loads across the transformers T37 and T43 are respectively connected to the switches S8 and S4 through a pair of sensing means 401 and 402.

Figure 5:
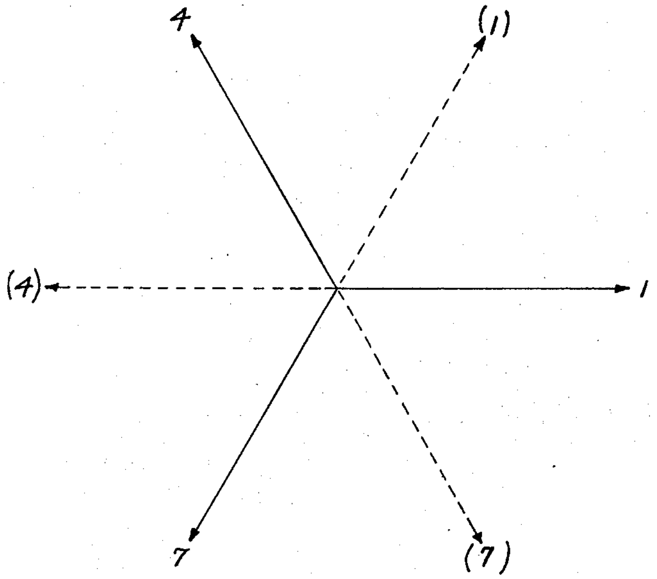
FIG. 5 is a phasor diagram of the total magnetomotive force in each of the cores of the non-linear inductors illustrated in FIG. 4.
Figure 6:
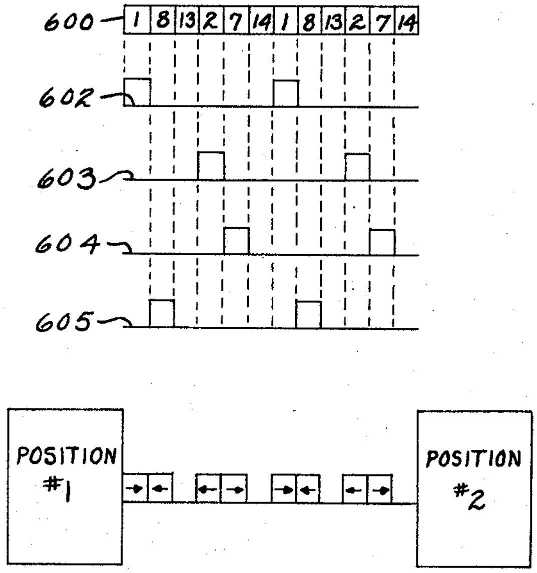
FIG. 6 is a time diagram of the signals generated by the pulse generators and of the direction of the signals as they pass across the single electrical path and to the devices to be controlled according to the embodiment of FIG. 4.

FIG. 5 illustrates the phase relationship between the magnetomotive force of the cores 10, 13 and 16 of the inductors 1, 4 and 7, respectively, as used in the six-channel system of FIG. 4. The phasors are numbered according to their respective inductors 1, 4 and 7 which also correspond with the phase relationship of the magnetomotive force of the cores 40, 43 and 46 of the inductors 31, 34 and 37. The solid line phasors illustrate the phase relationship of the magnetomotive force of the various inductors at the time the current through the input windings 1*a* and 31*a* passes through zero. The broken line phasors illustrate the relationship sixty degrees later. It may be noted that in the six channel system of FIG. 4 for every sixty degrees the current through one set of input windings passes through either the zero or one hundred and eighty degree point driving one of the cores out of saturation. Thus, the pulse generators PG and P′G′ may be designed so that each pulse has a duration up to sixty degrees as shown by the diagram 600 of FIG. 6. In the diagram 600 of FIG. 6, the signals of the channels CH1, CH2, CH7, CH8, CH13 and CH14 generated by the pulse generators PG and P′G′ are illustrated. The diagram 601 illustrates the direction of flow of the signals of the channels CH1, CH2, CH7 and CH8 as they appear across the interconnecting line L30 upon being coded, or selected by closing the switches S1, S2, S7 and S8. The diagrams 602, 603, 604 and 605 show the signals as they appear across the output transformers T31, T32, T37 and T38, respectively. As previously mentioned in connection with the embodiment of FIG. 1, the multiplexer of FIG. 4 is not limited to six channels. The bidirectional system may have any number of channels depending on the needs of the specific application. As the number of channels is increased or decreased, the cores and windings need be designed such that the signals for each channel have a discrete phase relationship. Though as means of illustration, the two-way system has been shown wherein the signals from Position #2 to Position #1 are dependent upon receiving signals from Position #1, those skilled in the art will readily recognize that there is no need for such limitation and a signal from Position #2 may be transmitted independent of signals from Position #1 such that independent two-way communication may be realized.

Figure 7:
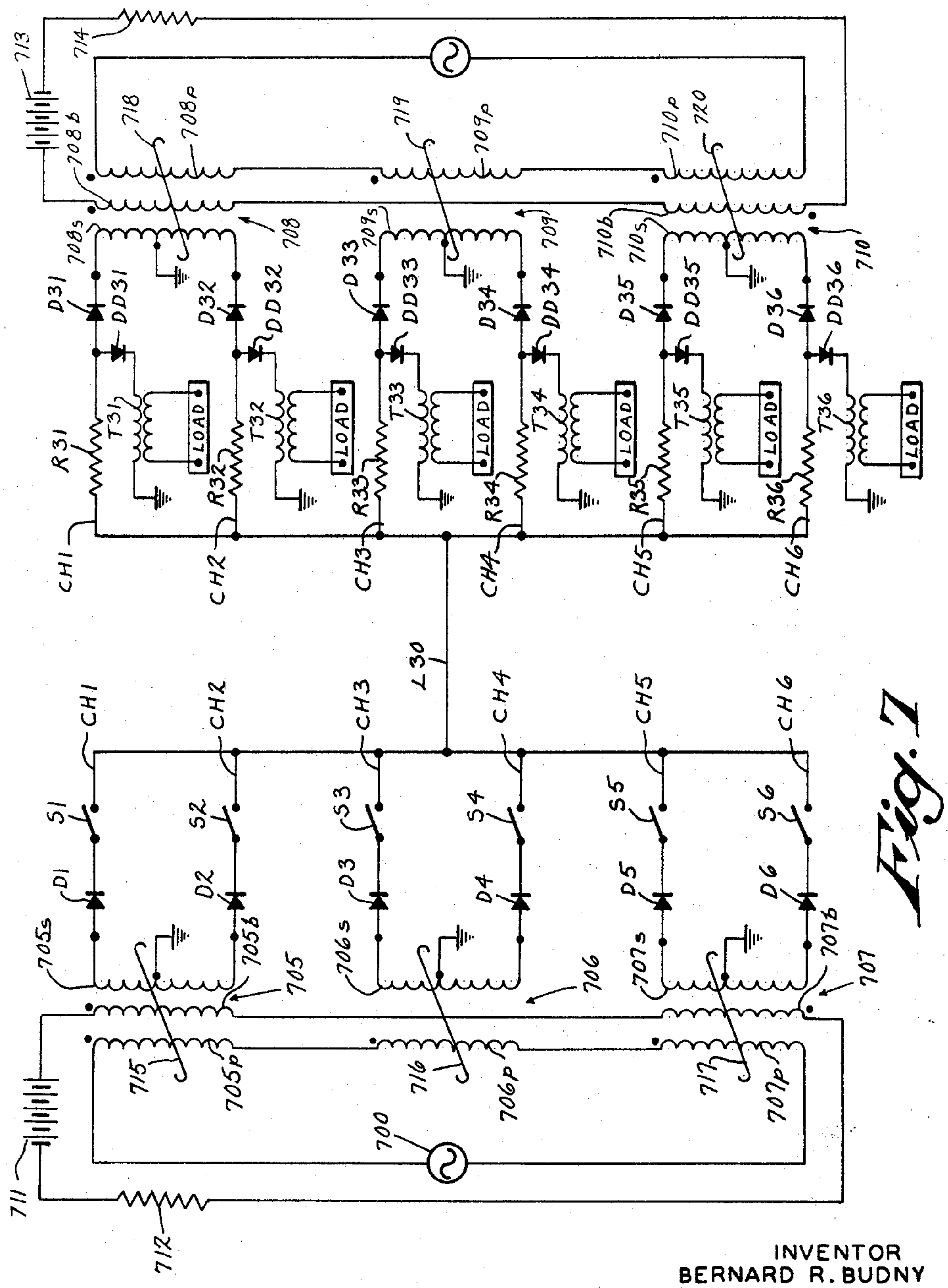
FIG. 7 is a schematic wiring diagram of a time division multiplexer in the form of a remote multiple load control embodying the principles of this invention and connected to a single phase sinusoidal source.

The preceding embodiments have been limited to three-phase sources. In many installations a three-phase source is not available and accordingly it is necessary to utilize a single phase source. FIG. 7 illustrates an embodiment incorporating the principles of the present invention which utilizes a single phase voltage source. It will be seen that the primary distinction between the embodiment of FIG. 7 from FIG. 1 is the generation of pulse signals. The coding and decoding means of both embodiments are the same. Thus, for reasons of simplicity and preciseness, FIG. 7 is shown as incorporating the diodes, switches and output transformers of the channels CH1–CH6 of FIG. 1. The generating means includes two regulated single phase voltage sources 700 and 701 each of which is connected in series with a set of three non-linear inductors 705–707 and 708–710, respectively. Also connected across the inductors 705–707 is a D.C. bias current source 711 in series with an impedance 712. The inductors 708–710 are connected across a D.C. bias current source 713 and an impedance 714.

The inductors 705–710 each comprise a magnetic frame, or core, respectively schematically represented by the partially oblique lines 715–720. The magnetic frames 715–720 will be comprised of magnetic materials shaped in suitable geometry, as is well known to the reactor and magnetic amplifier art, to support and be linked by a set of input windings 705*p*–710*p* and a set of output windings 705*s*–710*s*, respectively. The frames 705, 707, 708 and 710 each support a bias winding 705*b*, 707*b*, 708*b* and 710*b*, respectively.

The input windings 705*p*, 706*p* and 707*p* are connected in series and across the voltage source 700. The input windings 708*p*, 709*p* and 710*p* are connected in series and across the voltage source 701. The bias windings 705*b* and 707*b* are connected in series with the D.C. source 11 and the impedance 712. The bias windings 708*b* and 710*b* are connected in series with the D.C. source 713, and the impedance 714. For purposes of discussing the operation of the apparatus, polarity markings have been applied in FIG. 7 to the upper end of each of the input windings 705*p*–710*p*. The bias windings 705*b* and 707*b* are connected in opposing polarity as are the bias windings 707*b* and 710*b*.

Figure 8:
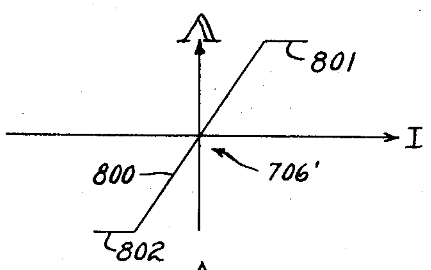
FIGS. 8–10 are magnetization curves for the inductors of the apparatus of FIG. 7.

Referring now to FIG. 8, there is shown therein an "idealized" magnetization curve 706′ for the inductors 706 and 709 with the ordinate $\Lambda$ measured in flux linkage and the abscissa I in amperes. For an "idealized" curve, the unsaturated region is represented by the oblique straight line 800 and the saturated regions by the horizontal lines 801 and 802.

Figure 9:
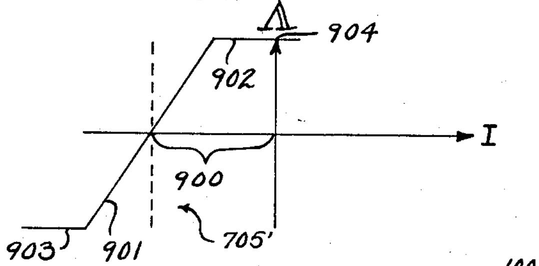

Referring now to FIG. 9, there is shown therein an "idealized" magnetization curve 705′ for the inductors 705 and 708 with a premagnetization direct current flowing through the bias windings 705*b* and 708*b* to establish premagnetization amperes of the amount shown by the bracket 900. The unsaturated region is represented by the oblique line 901 and the saturated regions by the horizontal lines 902 and 903. The premagnetizing bias places the magnetic frames 715 and 718 in a state of saturation, so that for alternating components of flux linkage and current the initial, or zero, point of operation is that point designated by the reference numeral 904.

Figure 10:
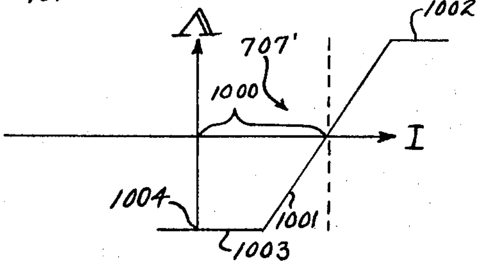

Referring now to FIG. 10, there is shown an "idealized" magnetization curve 707′ for the inductors 707 and 710 with a premagnetization direct current flowing through the bias windings 707*b* and 710*b* of the magnetic frames 717 and 720 to establish premagnetization amperes of the amount shown by the bracket 1000. The unsaturated region is represented by the oblique line 1001 and the saturated regions by the horizontal lines 1002 and 1003. The initial point of operation for the alternating components of flux linkage incurred is designated by the reference numeral 1004. It may be noted that the sense of premagnetizing saturation for the inductors 707 and 710 are of the opposite sense with respect to that for inductors 705 and 708.

Figure 11:
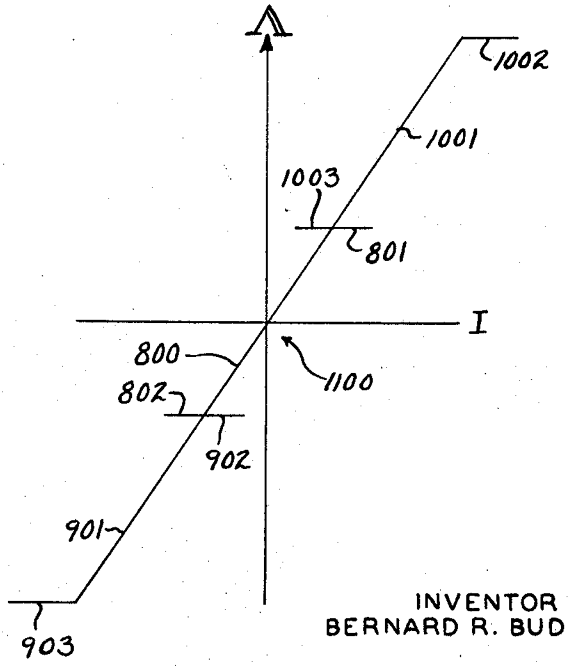
FIG. 11 is a composite magnetization curve of the inductors of the apparatus of FIG. 7.

FIG. 11 represents a composite "idealized" magnetization curve 1100 of the three inductors 705, 706 and 707 and the three inductors 708, 709 and 710. The curve 1100 is obtained by adding the flux linkage ordinates of the curves 705′, 706′ and 707′ of FIGS. 8–10, respectively. The summation results in a magnetization curve of non-linear characteristics in which the unsaturated region is comprised of the unsaturated regions 901, 800 and 1001 of the magnetization curves 705′, 706′ and 707′, respectively. It is further seen in FIG. 11, that the amount of direct current premagnetization has been selected so that the unsaturated regions are displaced with respect to one another along the abscissa so that they will fall in end-to-end alignment without overlapping whereby only one of the inductors 705, 706 or 707 and its corresponding inductor 708, 709 or 710 are unsaturated at any given time.

Figures 12, 19:
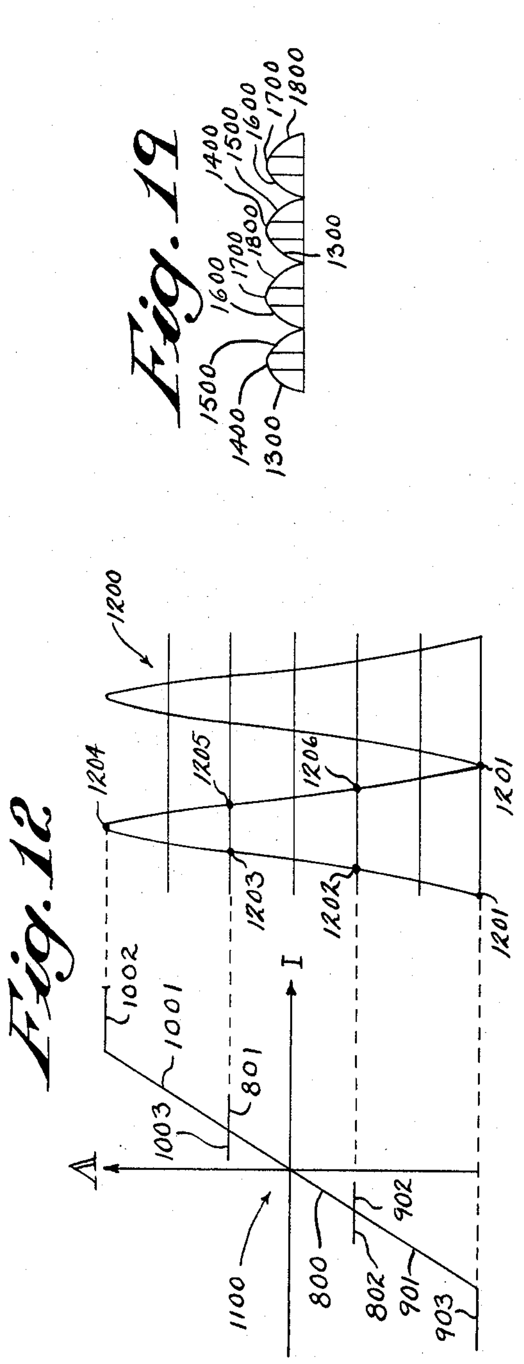
FIG. 12 is a graphical plot of a magnetic flux linkage wave supported by the inductors of the apparatus of FIG. 7, together with the composite magnetization curve of FIG. 11 positioned at the left of the flux linkage wave.
FIG. 19 is a composite time diagram of the signals generated by the pulse generators of FIG. 7.

Turning now to FIG. 12, the composite curve 1100 of FIG. 11 is reproduced, and to the right of the plot there is a plot of a flux linkage wave 1200 as may be had when the input windings 705*p*, 706*p* and 707*p* and/or the input windings 708*p*, 709*p*, 710*p* are respectively connected across the source voltages 700 and 701. The flux linkage wave 1200 is the integral value of the voltage sources 700 and 701, and assuming the voltage to be sinusoidal in character the flux linkage is also of sinusoidal character, but displaced ninety degrees with respect to the voltage.

Figures 13, 14, 15, 16, 17, 18:
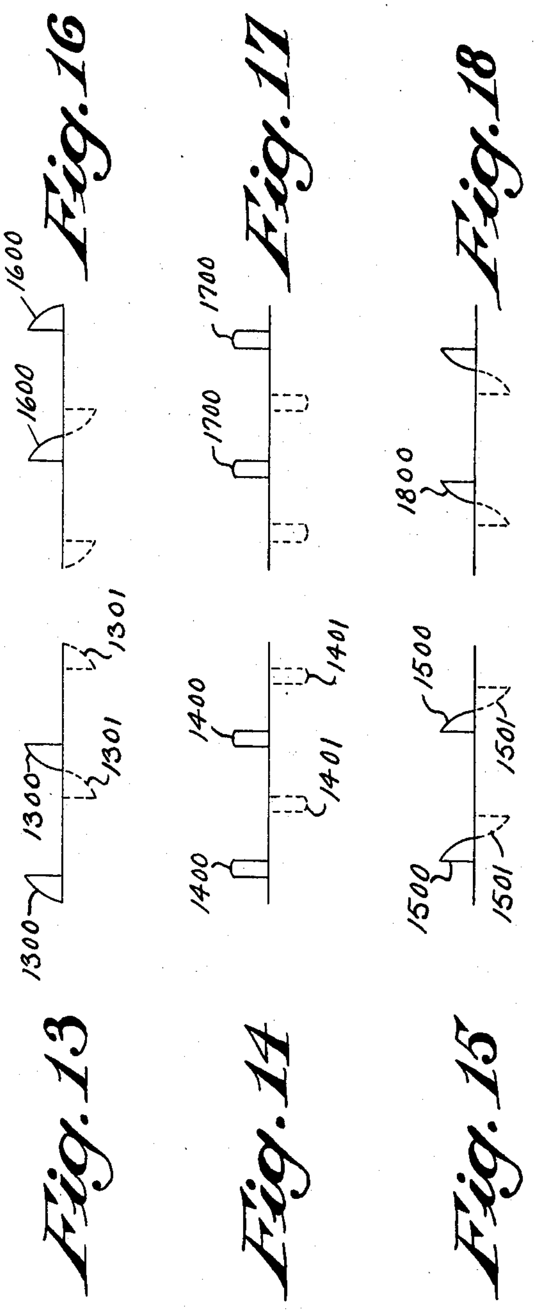
FIGS. 13–18 are graphical plots of the output voltages appearing across the inductors of the apparatus of FIG. 7.

Commencing at a point 1201 near the lefthand end of the wave 1200, the initial large negative value of flux linkage retains the cores 716, 717, 719 and 720 of the inductors 706, 707, 709 and 710, respectively, in a state of saturation. The magnetic frames 715 and 718 of the non-linear inductors 705 and 708 are driven into an unsaturated state to operate over the oblique portion of the magnetization curve 901'. Hence, the inductors 705 and 708 each support an A.C. component of flux, and coinciding voltage signals are induced across the output windings 705*s* and 708*s*. The coinciding induced voltage signals across the output windings 705*s* and 708*s* are represented in FIG. 13 by the solid line curve portion 1300. As the A.C. component of flux linkage passes beyond the point 1202 of the curve 1200, the cores 716 and 719 of the inductors 706 and 709, respectively, become unsaturated and the cores 715 and 718 become saturated. Thus, coinciding voltage signals are induced across the output windings 706*s* and 709*s*. These signals are represented in FIG. 14 by the solid line curve portion 1400.

As the flux linkage wave 1200 progresses past the point 1203, the cores 717 and 720 of the inductors 707 and 710, respectively, become unsaturated and the cores 716 and 719 return to the saturated state. Thus, coinciding signals represented by the solid line curve portion 1500 of FIG. 15 appear across the output windings 707*s* and 710*s*. The signal 1500 remains positive until the flux wave 1200 reaches its maximum amplitude, represented by a point 1204. At the point 1204, the flux linkage wave 1200 goes from a positive direction to a negative value and drives the cores 717 and 720 out of saturation in a negative direction. The signals appearing across the output windings 707*s* and 710*s* then become negative, as represented by a broken line curve 1501 of FIG. 15. However, since the output windings 707*s* and 709*s* each carry a center tap round, the curve 1501, as represented by a solid line curve 1600 in FIG. 16, appears positive to the diodes D6 and D36.

As the flux linkage path passes beyond the point 1205 of the curve 1200, the cores 717 and 720 return to the saturated state and the cores 716 and 719 are driven out of saturation and into unsaturation in a negative direction. A signal represented by the broken line curve 1401 of FIG. 14 appears across each of the output windings 706*s* and 709*s*. However, since the output windings 706*s* and 709*s* each carry a center tap ground, the signal 1401 appears positive to the diodes D4 and D34, as illustrated in FIG. 17 by a solid line curve 1700 which is the inverse of the curve 1401 of FIG. 14. Next, as the flux moves past the point 1206 of the curve 1200, the cores 715 and 718 are driven out of saturation in a negative direction and a negative signal, as represented by the broken line curve 1301 of FIG. 13 appears across each of the output windings 705*s* and 708*s*. As shown by the solid line curve 1800 of FIG. 18, the signal 1301 appears positive to the diodes D2 and D32. As the flux linkage completes a complete cycle and returns to the point 1201, the previously described generated signals are repeated.

Referring next to FIG. 19, there is shown a summation of the signal forms 1300, 1400, 1500, 1600, 1700 and 1800. It shall be noted that the phase relationship between each signal is discrete so that an operator by closing any of the switches S1–S6 can relay specific information related to each discrete signal. FIG. 19 may be viewed as a representation of the passage of the various signals across the interconnecting line L30 in the event all the switches S1–S6 are simultaneously in the closed position. Obviously, the amplitude of any one or all the signals can be altered by varying the number of turns on the secondary windings.

As set forth by the drawings and discussion, this invention lends itself to magnetic components which are highly reliable and efficient in nature. It presents a versatile multiplexer that can be readily designed to accommodate a small or large number of channels, and can be incorporated with either single or multiple phase input voltages. Those skilled in the art will readily recognize that the present invention may be designed with various known schemes whereby any number of phases may be generated and applied to the saturable core inductors. Further, though the illustrative embodiments have been limited to the use of individual signals as carrying certain information, the signals may be used in any combination to further increase its information carrying capacity. It should be noted that in each embodiment the single electrical path is shown as comprised of a single conducting line and the ground terminals at the sending position (position 1 of FIG. 4) are common with the ground terminals at the receiving position (position 2 of FIG. 4). In the event the ground terminals at the two positions are not common, two lines need be utilized to make up the single electrical path.

It will be apparent to those skilled in the art that the present circuit has many applications other than those mentioned herein. Accordingly, the breadth of the invention is to be determined not from the specific embodiments described herein, but rather from the appended claims.

I claim:

1. A bi-directional time division multiplexer for transmitting over a single electrical path a plurality of coded signals between a first and a second position, said multiplexer including:

a first electrical power source;

a second electrical power source synchronized with said first source;

a first magnetic means arranged to have any specified portion thereof driven to a periodic unsaturated state independent of the state of a neighboring portion and at an arbitrary time with respect to a response time on the driving signal, and responsive to said first source for generating a plurality of phase discrete electrical signals, said first magnetic means including a first plurality of independently saturable core inductors with associated input and output windings, said input windings being connected to said first source so that an application of current from the first source will successively drive the cores into and out of their unsaturated states, said output windings each having a grounded center tap and respective connecting terminals on opposing ends of said output terminals;

respective pairs of unidirectional current control elements for each inductor of said first magnetic means with each element of said pairs individually connected to opposite terminals of its respective output windings;

a second magnetic means arranged to have any specific portion thereof driven to a periodic unsaturated state independent of the state of a neighboring portion and at an arbitrary time with respect to a response time on the driving signal, and responsive to said second source for generating a plurality of phase discrete electrical signals, said second magnetic means including a second plurality of independently saturable core inductors with associated input and output windings with the input windings connected to said second source so that an application of current from said second source will successively drive the cores into and out of their unsaturated states and the output windings each having a grounded center tap and first and second connecting terminals;

respective pairs of unidirectional current control elements for each of said second inductors with each element of said pairs individually connected to opposite terminals of the output windings;

a first coding means for coding the signals generated by said first magnetic means appearing between the first terminals and the center taps of the output windings of said first magnetic means, said first coding means being connected to the unidirectional control elements of said first magnetic means;

a second coding means for coding the signals generated by said second magnetic means appearing between the second terminals and the center taps of the output windings of said second magnetic means, said second coding means being connected to the unidirectional control elements of said second magnetic means;

a single electrical path for transmitting said coded signals between said first and second positions, said path being connected to said first and second coding means;

a first means for detecting phase coincidence between the signals coded at the first coding means and the signals generated by the second magnetic means and appearing between the first terminals and the center taps of the output windings of the second magnetic means, said first detecting means being located proximate to said second position and connected to said single path and said second magnetic means; and a second means for detecting phase coincidence between said signals coded at said second coding means and the signals generated by said first magnetic means and appearing between the second terminals and the center taps of the output windings of said first magnetic means, said second detecting means being located proximate to said first position and connected to said single path and said magnetic means.

2. A time division multiplexer for transmitting coded signals from a sending station to a receiving station, said multiplexer comprising:

a first electrical power source;

a second electrical power source synchronized with said first source;

first magnetic means arranged to have any specific portion thereof driven to a periodic unsaturated state independent of the state of a neighboring portion and at an arbitrary time with respect to a response time on the driving signal, and responsive to said first source for generating a plurality of phase discrete electrical signals for said sending station;

said first magnetic means including a plurality of saturable core inductors, said inductors each having associated input and output windings with the input windings connected to said first power source so that an application of current from said power source will successively drive the core into and out of their unsaturated states and the output windings each having connecting terminals on opposing ends of each of said output windings, and a unidirectional current control element for each inductor;

second magnetic means arranged to have any specific portion thereof driven to a periodic unsaturated state independent of the state of a neighboring portion and at an arbitrary time with respect to a response time on the driving signal, and responsive to said second source for generating a plurality of phase discrete electrical signals for said receiving station, each of said signals generated by said second magnetic means having a coinciding phase relationship with a signal generated by said first magnetic means;

said second magnetic means including a second plurality of saturable core inductors, said second inductors each having associated input and output windings with the input windings connected to said second power source so that an application of current from said second power source will successively drive the cores into and out of their unsaturated states, and a unidirectional current control element for each of said second inductors;

means for coding the electrical control signals generated by said first magnetic means, said coding means being connected to the unidirectional elements of said first magnetic means to receive the generated signals of said first magnetic means;

conductor means connected to each of the unidirectional elements of said second magnetic means;

a single electrical path for transmitting said coded signals from said sending station to said receiving station, said path being connected to said coding means at one end thereof and to said conductor means at the opposite end thereof;

detecting means connected to said second magnetic means for detecting phase coincidence between said coded signals and the respective coinciding signals originating at said receiving station.

3. The multiplexer of claim 2 in which said first magnetic means includes a plurality of independently saturable core inductors equal in number to one-half the number of signals to be generated by said first magnetic means, said inductors each having associated input and output windings with the input windings connected to said first power source so that an application of current from said power source will successively drive the cores into and out of their unsaturated states and the output windings each having a grounded center tap and connecting terminals on opposing ends of each of said output windings, and respective pairs of unidirectional current control elements for each inductor with each element of said pairs individually connected to opposite terminals of its respective output winding; and said second magnetic means includes a second plurality of independently saturable core inductors equal in number to one-half the number of signals to be generated by said first magnetic means, said second inductors each having associated input and output windings with the input windings connected to said second power source so that an application of current from said second power source will successively drive the cores into and out of their unsaturated states, said output windings, each having a grounded center tap, connecting terminals on opposing ends of each of said output windings, and respective pairs of unidirectional current control elements for each of said second inductors with each element of said pairs individually connected to the opposite terminals of its respective output windings.

4. The multiplexer of claim 2 in which the coding means includes a plurality of switches each connected in series with respective ones of said unidirectional current control elements.

5. The multiplexer of claim 2 in which said detecting means includes a plurality of unidirectional current blocking elements each individually connected in series with a connecting terminal of the output windings of said second inductors so that signals across said output windings are blocked from passage through said terminals, a second plurality of unidirectional current control elements connected in common with said blocking elements and said single electrical path so that signals on said electrical path blocked from passage through said blocking elements pass through a member of said second plurality of control elements.

6. The multiplexer of claim 2 in which said first electrical power source includes a regulated three-phase voltage source; and said electrical power source includes a regulated three-phase voltage source synchronized with said first source.

7. The multiplexer of claim 2 in which said first source includes a single phase voltage source; and said second source includes a single phase phase voltage source synchronized with said first single phase source.

References Cited

UNITED STATES PATENTS

| | | | |
|---|---|---|---|
| 3,040,304 | 6/1962 | Brewster | 340—348 X |
| 3,110,895 | 11/1963 | Brewster | 340—166 |
| 3,174,050 | 3/1965 | Brewster | 340—166 |
| 2,817,079 | 12/1957 | Young | 340—167 X |
| 2,884,815 | 7/1958 | Winick | 340—164 X |
| 2,930,903 | 3/1960 | Andrews | 340—164 X |
| 3,012,226 | 12/1961 | Abbott | 340—164 |
| 3,035,248 | 5/1962 | Grose et al. | 340—163 |

JOHN W. CALDWELL, *Primary Examiner.*

NEIL C. READ, THOMAS B. HABECKER, *Examiners.*

H. PITTS, *Assistant Examiner.*

UNITED STATES PATENT OFFICE

CERTIFICATE OF CORRECTION

Patent No. 3,387,264 June 4, 1968

Bernard R. Budny

It is hereby certified that error appears in the above numbered patent requiring correction and that the said Letters Patent should read as corrected below.

Column 2, line 11, "nad" should read -- and --. Column 4, line 28, "line" should read -- lines --; line 57, "core" should read -- cores --. Column 5, line 14, "200" should read -- 300 --; line 46, cancel "path". Column 6, line 8, "T31-48" should read -- T31-T48 --; line 54, "windings," should read -- windings --. Column 8, line 23, "is", second occurrence, should read -- in --; line 28, "signal" should read -- single --. Column 10, line 16, "11" should read -- 711 --; line 23, "707b" should read -- 708b --. Column 11, line 47, "round" should read -- ground --; line 66, after "of" insert -- the --. Column 13, line 57, "core" should read -- cores --. Column 16, line 3, "2,884,815" should read -- 2,844,815 --.

Signed and sealed this 11th day of November 1969.

(SEAL)
Attest:

EDWARD M.FLETCHER,JR.
Attesting Officer

WILLIAM E. SCHUYLER, JR.
Commissioner of Patents